United States Patent

Genis et al.

Patent Number: 5,527,228
Date of Patent: Jun. 18, 1996

[54] TRANSMISSION

[75] Inventors: Leonhard Genis, Pretoria; Gérard Louw, Brits, both of South Africa

[73] Assignee: Atomic Energy Corporation of South Africa Limited, District Brits, South Africa

[21] Appl. No.: 247,993

[22] Filed: May 23, 1994

[30] Foreign Application Priority Data

May 24, 1993 [ZA] South Africa .................... 93/3605

[51] Int. Cl.$^6$ .................................................. F16H 3/70
[52] U.S. Cl. ..................... 475/170; 475/164; 475/169; 475/178
[58] Field of Search ..................... 475/162, 164, 475/169, 170, 178, 180

[56] References Cited

U.S. PATENT DOCUMENTS

| 1,072,237 | 9/1913 | Johnson et al. . |
| 3,987,682 | 10/1976 | Roantree . |
| 4,114,466 | 9/1978 | Meucci . |
| 4,177,695 | 12/1979 | Grove ................................ 475/180 |
| 4,299,581 | 11/1981 | Korosue . |
| 4,475,412 | 10/1984 | Evans . |
| 4,712,450 | 12/1987 | Takamiya et al. . |
| 5,024,637 | 6/1991 | Guichard . |
| 5,071,393 | 12/1991 | Genovese . |
| 5,081,877 | 1/1992 | Mercat . |
| 5,142,926 | 9/1992 | Huang . |
| 5,286,237 | 2/1994 | Minegishi ............................ 475/178 |
| 5,322,485 | 6/1994 | Haga .................................... 475/178 |

FOREIGN PATENT DOCUMENTS

| 88/2518 | 4/1988 | South Africa . |
| 1431335 | 4/1976 | United Kingdom . |

Primary Examiner—Charles A. Marmor
Assistant Examiner—Peter Kwon
Attorney, Agent, or Firm—Senniger, Powers Leavitt & Roedel

[57] ABSTRACT

A transmission 10 includes a drive member 12 which is rotatable about a first axis of rotation 20 and a driven member 14 which is rotatable about a second axis of rotation 26 and which is spaced axially from the drive member 12. The transmission 10 further includes an intermediate member 34 which is positioned between the drive and driven members 12, 14 and which is rotatable about a third axis of rotation 36. A plurality of axially displaceable drive elements 38 is provided for transmitting drive between at least one of the drive member and the intermediate member and the intermediate member and the driven member. The eccentricity of the intermediate member 34 relative to the drive and driven members 12, 14 is adjustable thereby to permit adjustment of the transmission ratio.

17 Claims, 2 Drawing Sheets

TRANSMISSION

SUMMARY OF THE INVENTION

This invention relates to a transmission.

According to one aspect of the invention there is provided a transmission which includes a drive member which is rotatable about a first axis of rotation;

a driven member which is rotatable about a second axis of rotation and spaced axially from the drive member;

an intermediate member which is positioned between the drive and driven members and which is rotatable about a third axis of rotation; and drive means for transmitting drive between the drive member and the intermediate member and between the intermediate member and the driven member, the drive means including a plurality of axially displaceable drive elements for transmitting drive between at least one of the drive member and the intermediate member and the drive member.

The drive means may include a first set of axially displaceable drive elements for transmitting drive between the drive member and the intermediate member, and a second set of axially displaceable drive elements for transmitting drive between the intermediate member and the driven member.

In a preferred embodiment of the invention, both the first and second sets of driving elements are mounted on the intermediate member.

Complementary drive formations may be provided on the drive and driven members, with which complementary drive formations the driving elements drivingly engage.

The complementary drive formations may be in the form of radially extending angularly spaced apart teeth-like formations.

Each driving element may be in the form of a pin, a portion of which is positioned in an axially extending bore in the intermediate member, with bias means being provided to urge the pin axially outwardly into engagement with the drive or driven member, as the case may be.

A plurality of spaced apart passages may extend axially through the intermediate member, with a pair of pins being positioned in each passage and urging means, e.g. in the form of a coil spring, being positioned between the pins so as to urge the pins axially outwardly such that they protrude axially from opposite ends of the passage into driving engagement with the drive and driven members.

The driving elements in the first set may be circumferentially staggered relative to the driving elements in the second set.

The transmission may include a housing within which the drive member, driven member and intermediate member are housed.

The first and second axes of rotation may be coaxial. The third axis of rotation may extend parallel to the first and second axes of rotation and the position of the intermediate member and of the third axis of rotation may be adjustable relative to the first and second axes of rotation thereby to permit the transmission ratio of the transmission to be varied.

The housing may define an eccentric circular cylindrical chamber which extends axially between opposed axially spaced apart faces of the drive and driven members, and the transmission may include an eccentric adjusting ring positioned within said chamber around the intermediate member, such that rotation of the eccentric ring relative to the housing serves to vary the degree of eccentricity of the intermediate member and hence of the third axis of rotation relative to the first and second axes of rotation, the transmission including an adjusting mechanism whereby the eccentric ring is rotatable relative to the housing.

In one embodiment of the invention the housing may optionally be rotatable about an axis of rotation such that if the third axis of rotation and hence the intermediate member is position eccentrically relative to the first and second axes of rotation and the housing is rotated whilst one of the drive and driven members is held stationary, then the other of the drive and driven members will rotate about its axis of rotation. An interesting aspect of this configuration is that the other of the drive and driven members which is being driven by the housing will rotate in the same direction irrespective of the direction of rotation of the housing, however, the angular velocity of the other of the drive and driven members will vary depending upon the direction of rotation of the housing.

According to another aspect of the invention there is provided a transmission which includes a drive member which is rotatable about a first axis of rotation;

a driven member which is rotatable about a second axis of rotation and which is spaced axially from the drive member;

an intermediate member which is positioned between the drive and driven members and which is rotatable about a third axis of rotation;

a first set of drive elements for transmitting drive between the drive member and the intermediate member;

a second set of drive elements for transmitting drive between the intermediate member and the driven member; and a plurality of axially protruding radially extending circumferentially spaced apart complementary drive formations on at least one of the driven and drive members with which the associated set of drive elements drivingly engage.

Preferably, complementary drive formations are provided on each of the drive and driven members.

The drive formations may be in the form of axially protruding, radially extending, circumferentially spaced apart teeth-like formations.

The position of the intermediate member and the third axis of rotation may be adjustable relative to the position of at least one of the first and second axes of rotation thereby to vary the effective transmission ratio of the transmission.

According to yet another aspect of the invention there is provided a transmission which includes a drive member which is rotatable about a first axis of rotation;

a driven member which is rotatable about a second axis of rotation;

an intermediate member rotatably mounted in a chamber in the drive member, the position of the chamber being adjustable between a position of zero eccentricity in which an axis of the chamber is coaxial with the second axis of rotation, and an eccentric position in which the axis of the chamber is eccentric to the second axis of rotation; and drive means for transmitting drive between the intermediate member and the driven member.

The first and second axes of rotation may be coaxial, the drive member being in the form of a hollow housing, within which an eccentric adjusting ring is mounted eccentrically, the adjusting ring defining the chamber within which the intermediate member is mounted. The transmission may also include adjusting means whereby the adjusting ring is rotatable within the housing thereby to vary the degree of eccentricity of the chamber and hence of the intermediate member.

The drive means may include a first set of drive elements mounted on and protruding axially from the intermediate member and drivingly engaging complementary drive formations on the driven member.

In a preferred embodiment of the invention, the transmission includes a pair of driven members which are spaced apart axially and positioned on opposite sides of the intermediate member, the drive means then including two sets of drive elements mounted on the intermediate member and protruding axially therefrom in opposite directions and drivingly engaging complementary drive formations on the driven members. The Applicant has found that in this embodiment of the invention, if one of the driven members is held in a stationary position, then the direction of rotation of the other driven member will be the same irrespective of the direction of rotation of the housing. However, the angular velocity of the other driven member will in fact vary depending upon the direction of rotation of the housing.

It will be appreciated by those skilled in the art that, at least in some of the embodiments of the invention, by reversing the direction of transmission of power the driven member becomes the drive member and vice versa.

The invention will now be described, by way of example, with reference to the accompanying diagrammatic drawings.

DETAILED DESCRIPTION OF THE PREFERRED EMBODIMENT

Figure 1:
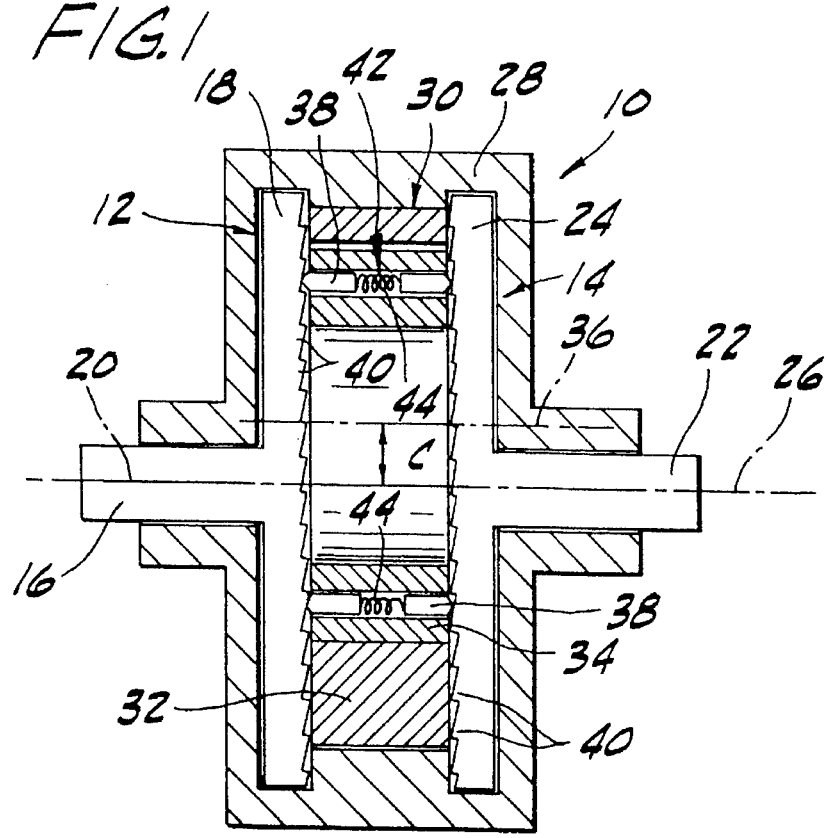
FIG. 1 shows schematically a sectional side view of a transmission in accordance with the invention.

In the drawings, reference numeral 10 refers generally to a transmission in accordance with the invention.

The transmission 10 includes a drive member, generally indicated by reference numeral 12 and a driven member, generally indicated by reference numeral 14.

The drive member 12 comprises a shaft 16 one end of which is connectable to an input member (not shown), and a circular plate 18 connected to the other end of the shaft 16. The drive member 12 is rotatable about a first axis of rotation 20.

The driven member 14 comprises a shaft 22 one end of which is drivingly connectable to an output member (not shown), and a circular plate 24 mounted on the other end of the shaft 22. The driven member 14 is rotatable about a second axis of rotation 26.

The driving member 12 and driven member 14 are positioned such that the first and second axes of rotation 20, 26 are coaxial and the plates 18, 24 are arranged with their faces which face away from the shafts 16, 22, respectively, being in a spaced apart mutually opposed relationship.

The plates 18, 24 and parts of the shafts 16, 22 of the drive and driven members 12, 14 are positioned within a housing 28. The housing 28 defines a circular cylindrical chamber 30 which extends between the opposed faces of the plates 18, 24 and which is eccentric thereto. The shafts 16, 22 protrude from the housing 28 for connection to the input and output members (not shown), respectively.

The transmission 10 includes an adjusting ring 32 which is snugly received and rotatable within the chamber 30. The adjusting ring 32 is eccentric and a circular cylindrical intermediate member or cage 34 is mounted therein such that rotation of the adjusting ring 32 within the chamber 30 serves to vary the eccentricity C of a third axis of rotation 36 about which the intermediate member 34 is rotatable, relative to the axes of rotation 20, 26.

Figure 2:
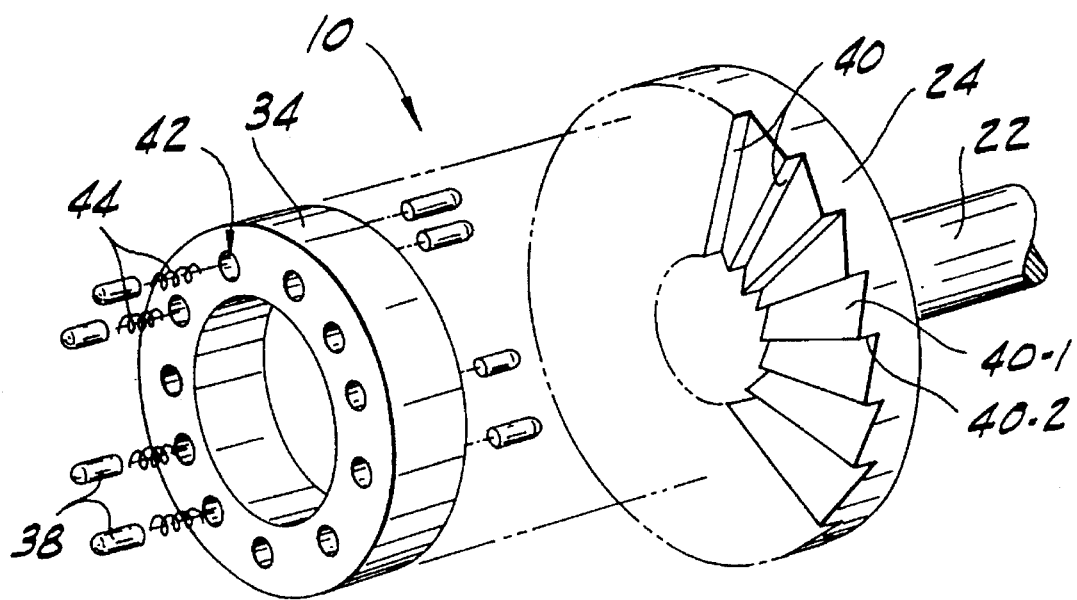
FIG. 2 shows a three-dimensional exploded view of part of the transmission of FIG. 1.

A plurality of circumferentially spaced drive elements in the form of axially extending pins 38 protrude axially from the intermediate member 34 and engage complementary drive formations in the form of circumferentially spaced apart axially protruding radially extending teeth-like formations 40 on the opposed surfaces of the plates 18, 24. As can best be seen in FIG. 2 of the drawings, each tooth-like formation 40 has a gently sloping surface 40.1 and a steeply sloping surface 40.2. The pins 38 are positioned in complementary passages 42 which extend axially through the intermediate member 34. A pair of pins 38 is provided in each passage 42 with a spring 44 being positioned between the inner ends of each pair of pins so as to urge the pins axially outwardly into engagement with the teeth-like formations 40. Hence, the pins 38 form two sets of drive elements, the pins 38 which drivingly engage the drive member 12 forming a first set of drive elements and the pins 38 which drivingly engage the driven member 14 forming a second set of drive elements.

It is to be appreciated, that the pins 38 will be held captive between the opposed surfaces of the plates 18, 24 and the springs 44. However, if desired, additional retaining means may be provided to retain the end portions of the pins 38 in the passages 42.

Figure 3:
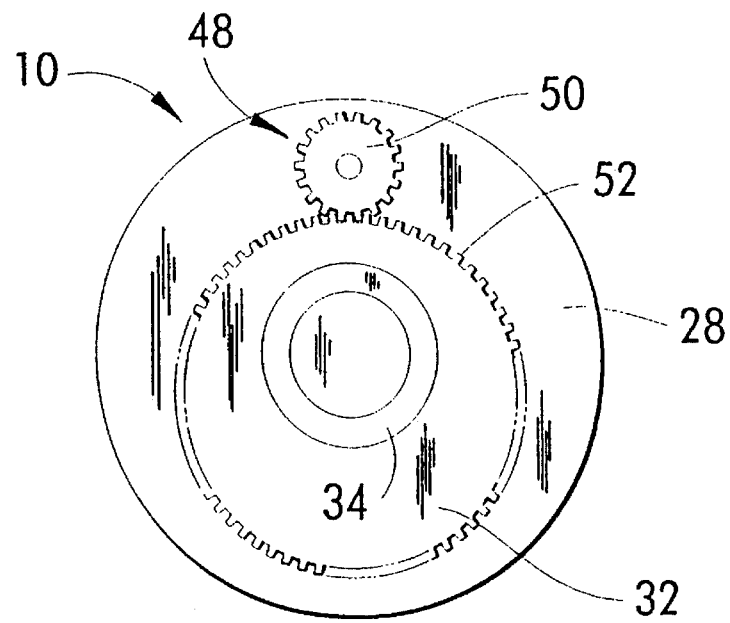
FIG. 3 shows schematically an adjusting mechanism forming part of the transmission of FIGS. 1 and 2.

With particular reference to FIG. 3 of the drawings, the transmission 10 includes an adjusting mechanism, generally indicated by reference numeral 48 whereby the adjusting ring 32 is rotatable relative to the housing 28 to vary the eccentricity C of the axis of rotation 36 relative to the axes of rotation 20, 26. In the embodiment shown, the adjusting mechanism 48 comprises a pinion 50 which is rotatably mounted on the housing 28 and which drivingly engages complementary circumferentially spaced teeth 52 on the periphery of the adjusting ring 32. Hence, by rotating the pinion 50, the adjusting ring 32 is rotated relative to the housing 28 thereby adjusting the eccentricity C. If desired, locking means may be provided to lock the pinion 50 and hence the adjusting ring 32 releasably in a desired position. It is to be appreciated, however, that rotation of the adjusting ring 32 relative to the housing 28 and indeed adjusting the eccentricity C could be effected in any suitable manner.

In use, the drive member 12 is rotated about the axis of rotation 20 in a fashion such that the formations 40 of the plate 18 drivingly engage one or more of the pins 38 to rotate the intermediate member 34 about the axis of rotation 36. As the intermediate member 34 rotates, the pins 38 protruding from the other side of the intermediate member drivingly engage the formations 40 of the plate 24 to rotate the driven member 14 about the axis of rotation 26. When the eccentricity C is zero, i.e. when the axis of rotation 36 is coaxial with the axes of rotation 20, 26, the speed ratio between the drive and driven members 12, 14 is 1:1.

The angular velocity of the pins 38 about the axis 36 remains constant irrespective of the eccentricity. When the eccentricity C is zero, the radial spacing between the pins 38 and the axes 20, 26 is constant. However, as the eccentricity C increases, the spacing between a given pin 38 and the axes 20, 26 will vary as the intermediate member 34 rotates about the axis 36. Hence, for a given angular displacement of the intermediate member 34 about the axis 36, the angular displacement of the pins 38 about the axes 20, 26 and hence the relative velocity between the pins 38 and the drive and driven members will vary.

Figure 4:
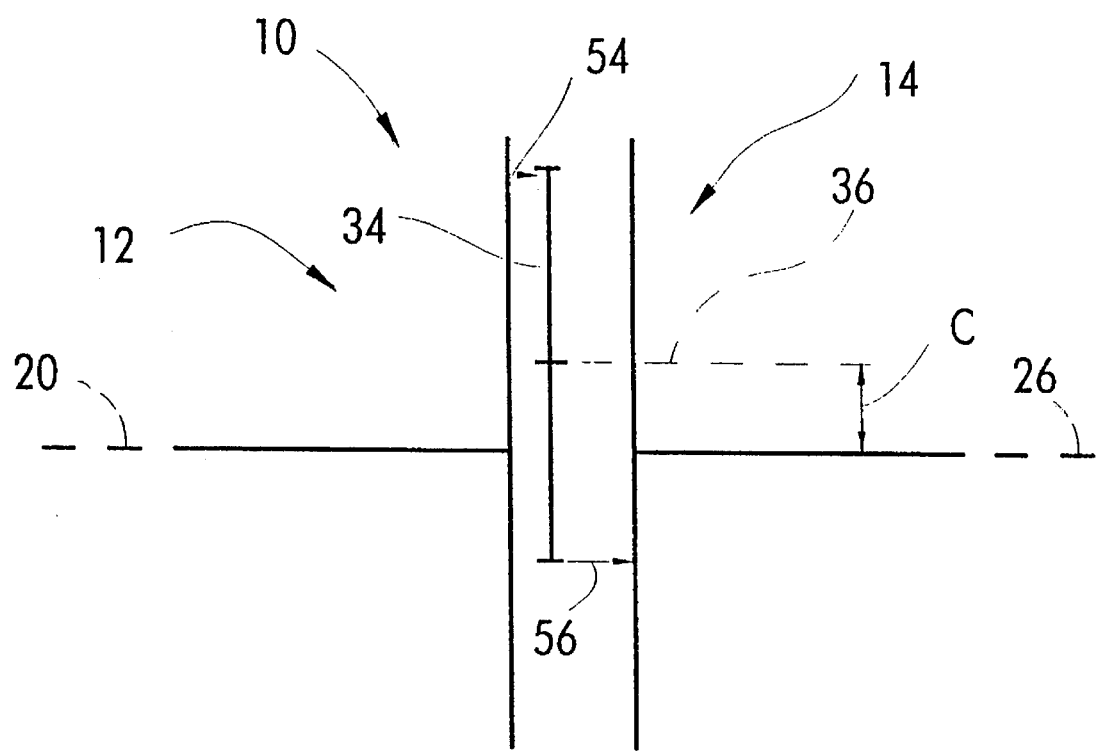
FIG. 4 shows schematically the transmission of drive from the drive member to the driven member of the transmission.

Drive is transmitted from the drive member 12 to the intermediate member 34 via the pin or pins 38 which are furthest from the axis of rotation 20 and which abut the steeply sloping surfaces 40.2 of the formations 40. The other pins 38 of the first set effectively slide along the gently sloping surfaces 40.1 of the formations 40 ratchet-fashion. This results in drive being transmitted from the drive member 12 to the intermediate member 34 by each pin 38 as it passes through an arc in which its radial spacing from the axis 20 is greater than the radial spacing of any of the other pins 38 from the axis 20. Similarly, drive from the intermediate member 34 to the driven member 14 is via the pin or pins 38 which are positioned closest to the axis 26. This drive arrangement is best illustrated in FIG. 4 of the drawings, in which drive from the drive member 12 to the intermediate member 34 is via the pin 38 passing through the position indicated by arrow 54 and drive from the intermediate member 34 to the driven member 14 is via the pin 38 passing through the position indicated by the arrow 56.

By reversing the direction of power transmission, i.e. by rotating the driven member 14, drive is transmitted through the pins or drive elements 38 and the intermediate member 34 to the drive member 12. An interesting feature of this configuration is that unlike conventional positive drive systems where the speed ratio in one direction is inversely proportional to the speed ratio in the other direction, with the transmission 10, the speed ratio in both directions is the same. In other words, if the drive member 12 is rotated and drives the driven member 14 such that the speed ratio is 1:4, then similarly, if the driven member 14 is rotated the speed ratio between the driven member 14 and the drive member 12 will also be 1:4. The Applicant believes that this feature will render the transmission 10 particularly suitable for use in hoisting equipment where it will provide an almost self-locking feature due to the high reverse gear ratio should drive to the driven member 12 be interrupted.

Further, if one of the drive member 12 and driven member 14 is locked in position and the housing 28 is rotated about the axis of rotation 20, 26, then provided that the eccentricity C is not zero, the other of the drive member 12 and driven member 14 will be rotated about its axis of rotation 20, 26 as the case may be. This is as a result of the intermediate member 34 and the pins 38 being rotated about the axis of rotation 20, 26 and hence transmitting drive to the drive or driven member 12, 14. An interesting aspect of this configuration is that the drive or driven member 12, 14 as the case may be, will be driven in the same direction irrespective of the direction in which the housing 28 is rotated. However, the rotational speed of drive or driven member 12, 14 as the case may be will vary depending on the direction in which the housing 28 is rotated. Hence, if the transmission is used in this fashion, the housing 28 will function as a drive member which is connectable to an input member, and the other of the drive member 12 and driven member 14 will function as a driven or output member. A unique feature of this arrangement is that zero speed is transmitted if the eccentricity C of the intermediate member 34 relative to the axes 20, 26 is zero. This means that although housing 28 is rotated the driven member 12 or 14, as the case may be, is at a standstill. As the eccentricity C of the intermediate member 34 is increased, the speed of the driven member 12 or 14, as the case may be, gradually increases. This arrangement may eliminate the need to use a clutch on the driven member.

As mentioned above, drive from the drive member 12 to the intermediate member 34 will be via the pin 38 whose spacing from the axis 20 is greater than any of the other pins 38 of the first set. However, during the arc for which any given pin is spaced further from the axis 20 than the other pins 38 its spacing from the axis 20 varies. Similarly, the same applies for the pins 38 of the second set which transmit drive to the driven member 14. This results in a cyclical oscillation of the speed ratio between the drive member 12 and the driven member 14. The amplitude of this cyclical variation can be reduced by increasing the number of pins 38 and thereby decreasing the length of the arc through which each pin 38 transmits drive. This can be achieved by decreasing the spacing between the pins, having a plurality of concentric annular rings of pins and/or in any other suitable manner. In addition, the amplitude of the oscillation may be decreased by arranging the pins in the first and second sets such that the oscillations between the drive member 12 and the intermediate member 34 and between the intermediate member 34 and the driven member 14 occur out of phase, e.g. by staggering the pins in the first and second sets.

It is to be appreciated that many variations to the configuration of the driven and driven members and the shape, number and arrangement of the driving elements is possible while still remaining within the scope of the invention.

Further, instead of making use of a positive drive system as described above, the drive elements could be in the form of frictional drive elements, e.g. in the form of so-called SPRAGG elements which frictionally engage the opposing surfaces of the plates 18, 24.

It is to be appreciated that many modifications could be made to the embodiments described above while still remaining within the scope of the invention. Hence, in addition to variations of the arrangement of the drive and driven members a plurality of the transmissions could be arranged in series so as to provide a desired speed ratio.

The Inventors believes that a transmission in accordance with the invention has numerous advantages over other variable speed transmissions of which the inventors are aware. These include the fact that a transmission in accordance with the invention can be extremely compact and rugged. In addition, the Inventors believe that the transmission will be reliable and have a service life which is at least comparable to that of other transmissions of which they are aware. A further advantage is the fact that the relative speed ratio between the drive and driven members can be varied under both static and dynamic conditions even when the transmission is under load conditions.

The Inventors believe that the transmission will be suitable for use in a large number of applications, hence, for example, in relatively low load applications such as on bicycles, fishing gear and the like, the transmission can be extremely light weight and compact. For higher load applications, e.g. motor vehicles, the transmission will naturally be larger.

We claim:

1. A transmission which includes:
   a drive member which is rotatable about a first axis of rotation;
   a driven member which is rotatable about a second axis of rotation and spaced axially from the drive member;
   an intermediate member which is positioned between the drive and driven members and which is rotatable about a third axis of rotation; and
   drive means for transmitting drive between the drive member and the intermediate member and between the intermediate member and the driven member, the drive means including a first set of axially displaceable drive elements mounted on the intermediate member for transmitting drive from the drive member to the intermediate member and a second set of axially displaceable drive elements mounted on the intermediate member for transmitting drive from the intermediate member to the driven member, each drive element being in the form of a pin a portion of which is positioned in an axially extending bore in the intermediate member, with bias means being provided to urge the pin axially outwardly into engagement with the drive or driven member, as the case may be.

2. A transmission as claimed in claim 1, in which complementary drive formations in the form of angularly spaced teeth-like formations are provided on the drive and driven members, with which complementary drive formations the drive elements drivingly engage.

3. A transmission as claimed in claim 1, in which a plurality of spaced apart passages extend axially through the intermediate member with a pair of pins being positioned in each passage and urging means being positioned between the pins so as to urge the pins axially outwardly such that they protrude axially from opposite ends of the passage into driving engagement with the drive and driven members.

4. A transmission as claimed in claim 1, in which the drive elements of the first set are circumferentially staggered relative to the drive elements of the second set.

5. A transmission as claimed in claim 1, which includes a housing within which the drive member, driven member and intermediate member are housed.

6. A transmission as claimed in claim 1, in which the first and second axes of rotation are co-axial.

7. A transmission as claimed in claim 1, in which the third axes of rotation extends parallel to at least one of the first and second axes of rotation and its position is adjustable relative to said at least one of the first and second axes of rotation.

8. A transmission as claimed in claim 5, in which the housing defines an eccentric circular cylindrical chamber which extends axially between opposed axially spaced apart faces of the drive and driven members, the transmission including an eccentric adjusting ring positioned within said chamber around the intermediate member such that rotation of the eccentric ring relative to the housing serves to vary the degree of eccentricity of the intermediate member and hence of the third of rotation relative go the first and second axes of rotation.

9. A transmission which includes:
   a drive member which is rotatable about a first axis of rotation;
   a driven member which is rotatable about a second axis of rotation and spaced axially from the drive member;
   an intermediate member which is positioned between the drive and driven members and which is rotatable about a third axis of rotation; and
   drive means for transmitting drive between the drive member and the intermediate member and between the intermediate member and the driven member, the drive means including a first set of axially displaceable drive elements mounted on the intermediate member for transmitting drive from the drive member to the intermediate member and a second set of axially displaceable drive elements mounted on the intermediate member for transmitting drive from the intermediate member to the driven member and complementary drive formations in the form of angularly spaced teeth-like formations provided on the drive and driven members, with which complementary drive formations the drive elements drivingly engage.

10. A transmission as claimed in claim 9, in which the drive elements of the first set are circumferentially staggered relative to the drive elements of the second set.

11. A transmission as claimed in claim 9, which includes a housing within which the drive member, driven member and intermediate member are housed.

12. A transmission as claimed in claim 9, in which the first and second axes of rotation are co-axial.

13. A transmission as claimed in claim 9, in which the third axis of rotation extends parallel to at least one of the first and second axes of rotation and its position is adjustable relative to said at least one of the first and second axes of rotation.

14. A transmission as claimed in claim 11, in which the housing defines an eccentric circular cylindrical chamber which extends axially between opposed axially spaced apart faces of the drive and driven members, the transmission including an eccentric adjusting ring positioned within said chamber around the intermediate member such that rotation of the eccentric ring relative to the housing serves to vary the degree of eccentricity of the intermediate member and hence of the third axes of rotation relative to the first and second axes of rotation.

15. A transmission which includes:
   a drive member in the form of a hollow housing which is rotatable about a first axis of rotation;
   an eccentric adjusting ring mounted eccentrically in the housing, the adjusting ring defining a chamber;
   a driven member which is rotatable about a second axis of rotation which is co-axial with the first axis of rotation;
   an intermediate member rotatably mounted in the chamber defined by the adjusting ring, the position of the chamber being adjustable between a position of zero eccentricity in which an axis of the chamber is co-axial with the first and second axes of rotation, and an eccentric position in which the axis of the chamber is eccentric to the first and second axes of rotation; and
   drive means for transmitting drive between the intermediate member and the driven member.

16. A transmission as claimed in claim 15, in which the drive means includes a first set of drive elements mounted on and protruding axially from the intermediate member and drivingly engaging complementary drive formations on the driven member.

17. A transmission as claimed in claim 15, which includes two driven members spaced axially apart on opposite sides of the intermediate member, and two sets of drive elements mounted on and protruding axially from the intermediate member and drivingly engaging complementary drive formations on the driven members.

* * * * *